United States Patent

[11] 3,581,605

| [72] | Inventor | John Robert Taylor<br>Mountain Lakes, N.J. |
|---|---|---|
| [21] | Appl. No. | 872,262 |
| [22] | Filed | Oct. 29, 1969 |
| [45] | Patented | June 1, 1971 |
| [73] | Assignee | Allied Chemical Corporation<br>NY, N.Y. |

[54] OPENING DEVICE FOR MEMBRANE-SEALED PLASTIC BOTTLES
6 Claims, 3 Drawing Figs.

[52] U.S. Cl. .................................................. 81/3.49,
215/46.5, 30/16, 30/1.5
[51] Int. Cl. ................................................ B67b 7/24
[50] Field of Search .......................................... 81/3.48,
3.49, 3.34, 3.1, 3.1(B&C); 30/1.5, 130, 16, 6.1,
6.4; 215/55, 46, 42, 46.5, 6 (Cursory)

[56] References Cited
UNITED STATES PATENTS

| 948,392 | 2/1910 | Dougherty ................... | 81/3.48 |
| 1,131,985 | 3/1915 | Bellois ........................ | 215/55 |
| 1,664,047 | 3/1928 | Sacerdote .................... | 81/3.49 |
| 1,699,607 | 1/1929 | Cole ........................... | 81/3.49 |
| 2,152,001 | 3/1939 | Temple ....................... | 215/42 |
| 2,545,237 | 3/1951 | Maby .......................... | 30/130 |
| 3,298,100 | 1/1967 | Walker et al. ............... | 30/16 |
| 3,074,592 | 1/1963 | Stocking ..................... | 30/16X |

*Primary Examiner*—Robert C. Riordon
*Assistant Examiner*—Roscoe V. Parker, Jr.
*Attorney*—Ernest A. Polin ABSTRACT: A device for safe removal of and disposal of membrane seals from plastic bottles containing dangerous liquids comprising a protective cap adopted to fit over the neck of the bottle to be opened, a combined membrane piercing and extracting member mounted within the cap in recessed position, and an annular cutting member having a serrated cutting edge mounted within the cap in recessed position surrounding the combined membrane piercing and extracting member.

PATENTED JUN 1 1971  3,581,605

INVENTOR.
JOHN R. TAYLOR
BY Gerhard H. Fuchs
ATTORNEY

OPENING DEVICE FOR MEMBRANE-SEALED PLASTIC BOTTLES

BACKGROUND OF THE INVENTION

This invention relates to a device for safe removal and disposal of membrane seals from plastic bottles containing flammable, corrosive, or similarly dangerous liquids.

For the sake of convenience and safety, dangerous liquids such as flammable or corrosive reagents are often shipped and stored in nonfrangible bottles made of relatively inert plastic materials such as polyethylene, polyvinyl chloride, copolymers of chlorotrifluoroethylene and vinylidene fluoride and the like. These bottles are provided with a conventional closure, such as a screw cap, and, as a further protection against spillage in shipment and storage before use and to insure purity of contents, the openings of such bottles are often hermetically sealed with a membrane seal made of plastic material which seal is affixed to the bottle neck at or near the rim thereof. Access to the contents of bottles so sealed is conventionally gained by puncture or destructive removal of the membrane seal using a sharp instrument such as a knife, razor blade, and the like. The bottle contents thereafter are confined and protected by replacing the screw cap.

Puncture or destructive removal of such membrane seals by conventional methods inherently involves danger of spraying the operator with vapors and/or liquids expelled from the bottles as the result of sudden release of internal bottle pressure when the seal is punctured. Internal bottle pressure may be caused by thermal expansion of bottle contents and/or external pressure applied to the bottle, as e.g., by the operator firmly gripping the bottle when opening the membrane seal.

Disposal of these membrane seals after removal, if carelessly done, involve danger of direct contact of liquid bottle contents adhering to the separated membrane seal with the hands of the operator. Direct skin contact with certain dangerous chemicals such as acids, in particular nitric and hydrofluoric acids, can cause serious injury to the operator.

Accordingly, there is an obvious need for a tool which allows removal in a safe manner of membrane seals from plastic bottles containing dangerous liquids, and particularly for such a tool which at the same time allows disposal of the separated membrane seal under assured avoidance of direct skin contact therewith.

It is a principle object of the present invention to provide a device for safe removal of membrane seals from bottles containing dangerous liquids.

It is a further object of the present invention to provide a device for safe removal of membrane seals from bottles containing dangerous liquids.

It is a further object of the present invention to provide a device for safe removal of membrane seals from bottles containing dangerous liquids which at the same time facilitates disposal of the separated membrane seal in a safe manner.

It is yet another object of the present invention to provide, in combination with a bottle cap, a device for safe removal and disposal of plastic membrane seals from bottles containing dangerous liquids.

SUMMARY OF THE INVENTION

With these objects in view the invention consists of the features of construction, combination of element and arrangement of parts as hereinafter illustrated and described.

Briefly, the above-stated and other objects are achieved by the provision of a combined membrane removal-disposal device comprising, in combination, (a) a protective cap, adapted to fit over a neck of the bottle to be opened, (b) a combined membrane piercing and extracting member mounted within the cap in recessed position, and (c) an annular cutting member having a serrated cutting edge mounted within the cap in recessed position surrounding the combined membrane piercing and extracting member. For the sake of convenience and to insure its ready availability the combined membrane removal-disposal device is preferably supplied together with the bottle in combination with the bottle cap, conveniently attached to the bottle cap in superimposed relationship.

To open a bottle having a membrane seal using the invention device the bottle cap is removed, the combined membrane removal-disposal device is placed over the membrane-sealed bottle neck and is pushed downwardly against the bottle neck, so that the combined membrane piercing and extracting member pierces the membrane seal to allow pressure equalization between bottle space and surrounding atmosphere. Upon further downward movement of the device the annular cutting member cuts the membrane seal where it joins the neck of the bottle, thereby completely severing the membrane seal from the bottle neck. Throughout the piercing and cutting operations the cap confines or deflects away from the operator vapor or liquid spray or splashes if such should be expelled from the bottle by reason of internal bottle pressure or brisk movement of the bottle. When the device is lifted away from the bottle neck the combined membrane piercing and extracting member retains the severed membrane within the space enclosed by the cap and the device together with the severed membrane is disposed of. Accidental contact of the operator with the severed membrane during the removal and disposal operations is effectively prevented by the cap.

DESCRIPTION OF THE DRAWING

In the annexed drawings

In the drawings like reference numerals denote like parts.

DESCRIPTION OF THE INVENTION

Figure 1:
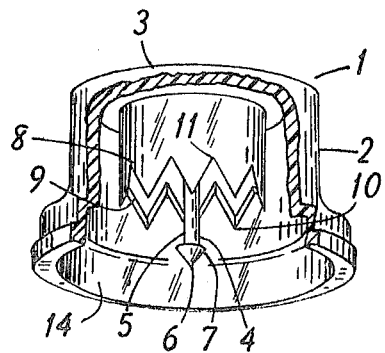
FIG. 1 is a perspective fragmentary view of a combined membrane removal-disposal device of the present invention.

With reference to FIG. 1 there is shown one embodiment of the combined membrane removal-disposal device of the present invention which comprises, in combination, a. a cap 1, adapted to be placed over the neck of the bottle the membrane seal of which is to be removed, having a downwardly extending peripheral skirt 2 and a top closure 3;

b. a combined membrane piercing and extracting member 4 centrally mounted within cap 1 on top closure 3, having an elongated shank 5 ending in a piercing end 6 terminating within the space enclosed by cap 1, the intermediate part of elongated sank 4 having a reduced diameter portion forming a peripheral shoulder 7; and c. an annular cutting member 8 adapted to fit into the neck of the bottle the membrane seal of which is to be removed, in close proximity to the inner wall of the bottle neck, having a serrated cutting edge 9, concentrically mounted within cap 1 on top closure 3 to surround combined membrane piercing and extracting member 4, and in spaced relation to both downwardly extending peripheral skirt 2 and combined membrane piercing and extracting member 4, tips 10 of serrated cutting edge 9 terminating between top closure 3 and peripheral shoulder 7 of combined membrane piercing and extracting member 4, and serrations 11 of serrated cutting edge 9 terminating a distance away from the inner surface of top closure 3.

Piercing end 6 of combined membrane piercing and extracting member 4 may have any shape compatible with its piercing function. Thus, it may have the shape of a cutting edge, a sharp point, and the like. Preferably, piercing end 6 has the shape of a point, as illustrated in the drawing.

Cap 1, combined membrane piercing and extracting member 4 and annular cutting member 8 in operation each perform specific functions the sequential cooperation of which is essential to successful performance of the device of the present invention. The following description of the operation of the invention device details these specific functions and their sequential cooperation.

Figure 2:
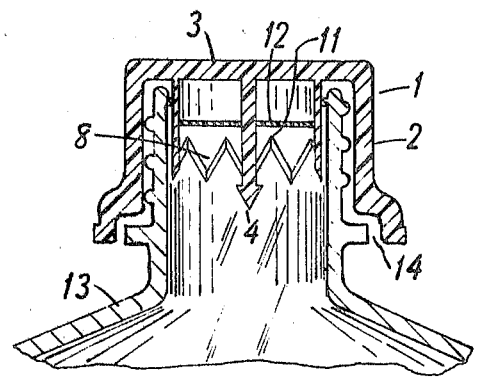
FIG. 2 is a view of a combined membrane removal-disposal device of the present invention in partial cross section together with the bottle neck, in cross section, illustrating operation of the device.

To remove a membrane seal from a bottle neck using the invention device the bottle cap is removed and the invention device is placed over the bottle neck so that the downwardly extending peripheral skirt 2 of cap 1 surrounds the sides of the bottle neck at the top portion thereof and piercing end 6 of combined membrane piercing and extracting member 4 comes to rest on the top surface of the membrane seal in the center portion thereof. The downwardly extending peripheral skirt 2 centers the device on the bottle neck and acts as a guide to straight movement of the device during the following piercing, cutting and membrane removal operations. The device is then pressed downwardly against the membrane seal so that piercing end 6 pierces the membrane to provide a relatively small opening for gradual venting of internal bottle pressure, if present, thereby minimizing danger of sudden splashes of liquid bottle contents. During the piercing and venting step, as well as during the following membrane cutting and removal steps, cap 1 shields the operator from vaporous or liquid spray or splashes if such should be expelled from the bottle by reason of either internal bottle pressure or brisk movement of the bottle. Upon further downward movement of the invention device piercing end 6 will be completely pushed through the membrane, so that the membrane, while still attached to the bottle neck, will come to surround elongated shank 5 of combined membrane piercing and extracting member 4, and will be positively locked onto elongated shank 5 by peripheral shoulder 7. Upon further downward movement of the device the serrated cutting edge 9 of annular cutting member 8 cuts through the membrane seal in the vicinity of its place of attachment to the bottle neck to completely sever the membrane from the bottle neck. Operation of the invention device is illustrated by FIG. 2 which shows the device in relation to the bottle neck 13, in the lowermost position after the membrane seal 12 has been completely severed from the bottle neck 13. As shown in FIG. 2, severed membrane seal 12 is pierced by and retained on combined membrane piercing and extracting member 4. Upon completion of the membrane seal cutting operation the device is lifted away from the bottle neck. The severed membrane seal, positively locked to elongated shank 5 of combined membrane piercing and extracting member 4 by peripheral shoulder 7, is retained within the space enclosed by cap 1, thereby shielding the operator from accidental contact with the severed membrane and liquid bottle contents which may adhere thereto. The device together with the severed membrane confined therein is then disposed of in a suitable receptacle. If desired, the device may be reused after proper decontamination followed by removal of the severed membrane.

Proper performance of the above-described sequential combination of functions require that the elements of the invention device are properly proportioned with respect to the bottle neck to be opened as well as with respect to each other.

To maximize spray and splash protection, and for proper performance of the centering and guiding functions, cap 1 must be adapted to fit over the bottle neck, preferably with minimum excess lateral clearance. Thus, the inner diameter of downwardly extending peripheral skirt 2 of cap 1 preferably is only slightly larger than the outer diameter of the bottle neck, including external threads of the bottle neck. Suitably, the inner diameter of downwardly extending peripheral skirt 2 is between about 1.00 times and about 1.10 times, preferably between about 1.00 times and about 1.05 times the outer diameter of the bottle neck including external threads of the bottle neck.

The length of downwardly extending peripheral skirt 2, measured inside of cap 1, may not exceed the length of the bottle neck, so that cap 1 may be placed over the bottle neck to the full extent of its depth. On the other hand, the greater the depth of cap 1, that is the greater the length of downwardly extending peripheral skirt 2, the greater is the protection afforded to the operator against sprays or splashes occurring during the operation of the device and against accidental contact with the severed membrane after removal of the device from the bottle neck.

The annular cutting member 8 must be adapted to fit into the neck of the bottle to be opened in close proximity to the inner wall of the bottle neck so that, during the cutting operation, the membrane seal will be firmly held against the cutting edge of the annular cutting member by the bottle neck, thereby insuring complete severance of the membrane seal.

The piercing end 6 of combined membrane piercing and extracting member 4 as well as the tips 10 of serrated cutting edge 9 of annular cutting member 8 must be recessed within the space enclosed by cap 1. Further, tips 10 of serrated cutting edge 9 must terminate above peripheral shoulder 7 of combined membrane piercing and extracting member 4, to insure that, in operation, the membrane will be securely locked to elongated shank 5 of combined membrane piercing and extracting member 4 by peripheral shoulder 7 before commencement of the cutting operation.

To maximize the protection afforded the operator by cap 1 during the various operations as described above, both the combined membrane piercing and extracting member 4 and the annular cutting member 8 are preferably recessed as deeply within cap 1 as is consistent with proper performance of their respective functions. Thus, to insure complete severance of the membrane seal from the bottle neck the serrations 11 of serrated cutting edge 9 must terminate a distance away from the inner surface of top closure 3 of cap 1, which distance must be at least as great as the distance measured from the top of the rim of the bottle neck to the underside of the membrane seal, and is preferably slightly in excess of that distance. The depth of the serrations of serrated cutting edge 9 is determined by the number of serrations provided and the angle formed by the serrations. The angle of the serrations required for proper performance of the cutting operations is primarily determined by the sharpness of the cutting edge 9 and the ease with which the material of which the membrane seal is constructed can be cut. If the material of which this membrane seal is constructed is easily cut, and if the cutting edge is sharp, then the angle formed by the serrated cutting edge at the tips thereof may be quite obtuse. If, on the other hand, the cutting edge is dull and the material of which the membrane seal is constructed is difficult to cut, then the angle of the serrations should be rather acute. Proper selection of the number of serrations of annular cutting member 8 and of the angle to be formed by these serrations is within the skills of the art. Preferably the annular cutting member is provided with at least three serrations.

Figure 3:
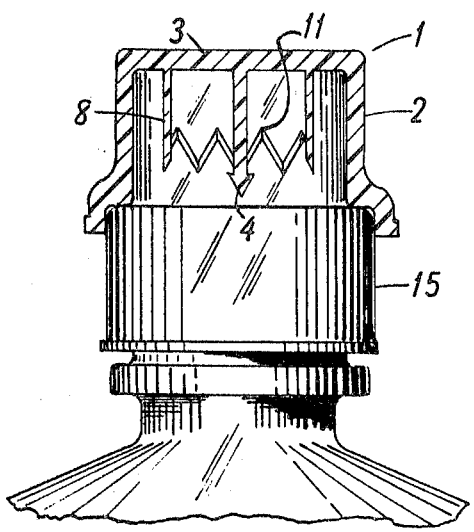
FIG. 3 is a perspective view of a combined membrane removal-disposal device of the present invention in combination with bottle closure, showing the membrane removal-disposal device in cross section.

To insure ready availability of a properly dimensioned device of the present invention at the point of need, the invention device is preferably supplied together with the bottle, conveniently attached to the bottle cap in superimposed relationship in the manner illustrated by FIG. 3. Attachment of the invention device to the bottle cap 15, as shown in FIG. 3, is preferably effected by press fit. For that purpose downwardly extending peripheral skirt 2 is provided with an inner circumferential recess 14 at the lower end thereof, the inner diameter of which is chosen to allow gripping engagement with the top portion of the bottle cap 15. Other means for effecting attachment of the invention device to the bottle cap will readily occur to those skilled in the art.

The device of the present invention may be made of any suitable rigid material such as metal, plastics, hard rubber and the like. Transparent materials such as clear polystyrene allow visual observation of the piercing and cutting operations and for that reason are preferred materials of construction for the device of the present invention. The device may be formed in one piece, as by molding, or may be manufactured by assembly of individually formed components.

In actual operation, it has been found that for use on a gallon size bottle made of polyethylene having a 1.00 inch long neck of 1.50 inch outer and 1.05 inch inner diameter the opening of which is sealed with a 0.002 inch thick membrane seal made of polyethylene, the distance from the top rim of the bottle neck to the underside of the membrane seal being 0.002 inch, very satisfactory results are obtained with an invention device having the following dimensions. Cap 1 has an inner depth of 1.10 inch and downwardly extending peripheral skirt 2 has an inner diameter of 1.50 inch. Annular cutting member 8 has eight serrations and an outer diameter of 1.00 inch. The tips 10 and serrations 11 of serrated cutting edge 9 of annular cutting member 8 respectively terminate a distance of 0.35 inch and 0.20 inch from the inner surface of top closure 3 of cap 1. Elongated shank 5 of combined membrane piercing and extracting member 4 has a 0.10 inch diameter. Peripheral shoulder 7 has a diameter of 0.20 inch and is located a distance of 0.50 inch away from the inner surface of top closure 3 of cap 1, and piercing end 6 of combined membrane piercing and extracting member 4, which piercing end has the shape of a point as illustrated in the drawings, terminates a distance of 0.75 inch away from the inner surface of top closure 3. The device is molded of polystyrene.

It will be obvious to those skilled in the art that changes in construction and arrangement of the parts of my invention may be made without departing from the spirit and purpose of the invention. It is accordingly intended to include by the claims all modifications of structure or mechanical equivalents thereof reasonably included within the scope of the appended claims.

I claim:

1. A combined membrane removal-disposal device for membrane sealed plastic bottles which comprises, in combination,
   a. a cap, adapted to be placed over the neck of the bottle the membrane seal of which is to be removed, having a downwardly extending peripheral skirt and a top closure.
   b. a combined membrane piercing and extracting member centrally mounted within the cap on the top closure thereof, having an elongated shank ending in a piercing end terminating within the space enclosed by the cap, the elongated shank having a reduced diameter portion forming a peripheral shoulder, and
   c. an annular cutting member adapted to fit into the neck of the bottle the membrane seal of which is to be removed, in close proximity to the inner wall of the bottle neck, having a serrated cutting edge, concentrically mounted within the cap on the top closure thereof to surround the combined membrane piercing and extracting member and in spaced relation to both the downwardly extending peripheral skirt and the combined membrane piercing and extracting member, the tips of the serrated cutting edge terminating between the inner surface of the top closure of the cap and the peripheral shoulder of the combined membrane piercing and extracting member, and the serrations of the serrated cutting edge terminating a distance away from the inner surface of the top closure.

2. A device according to claim 1 wherein the piercing end of the combined membrane piercing and extracting member has the shape of a point.

3. A device according to claim 2 wherein the serrated cutting edge of the annular cutting member is provided with at least three serrations.

4. A device according to claim 3 made of a transparent plastic material.

5. A device according to claim 3 wherein the downwardly extending peripheral skirt is provided with an inner circumferential recess at the lower end thereof adapted to allow gripping engagement with the op portion of a bottle cap.

6. The combination of a device according to claim 5 and a bottle cap, said device being removably affixed to said bottle cap in superimposed relationship by gripping engagement of the downwardly extending peripheral skirt at the inner circumferential recess thereof with the top portion of the bottle cap.